US006017378A

United States Patent [19]
Oussoren et al.

[11] Patent Number: 6,017,378
[45] Date of Patent: *Jan. 25, 2000

[54] UNITARY FILTER CARTRIDGE

[75] Inventors: Reinout G. Oussoren, Balsthal, Switzerland; Jack T. Clements, Lee's Summit, Mo.

[73] Assignee: BHA Group Holdings, Inc., Kansas City, Mo.

[ * ] Notice: This patent is subject to a terminal disclaimer.

[21] Appl. No.: 09/273,792

[22] Filed: Mar. 22, 1999

Related U.S. Application Data

[63] Continuation of application No. 08/862,552, May 23, 1997, Pat. No. 5,885,314, which is a continuation of application No. 08/350,885, Dec. 6, 1994, Pat. No. 5,632,791, which is a continuation-in-part of application No. 29/022,499, May 6, 1994, abandoned.

[51] Int. Cl.[7] .................................................... B01D 50/00
[52] U.S. Cl. ................................. 55/486; 55/498; 55/500; 55/502; 55/521
[58] Field of Search ............................. 55/369, 371, 373, 55/375, 376, 377, 378, 379, 381, 486, 498, 500, 502, 521, DIG. 26

[56] References Cited

U.S. PATENT DOCUMENTS

| 4,560,477 | 12/1985 | Moldow ..................................... 55/498 |
| 4,813,985 | 3/1989 | Brennecke et al. ........................ 55/378 |
| 4,954,255 | 9/1990 | Muller et al. .............................. 55/498 |
| 5,207,811 | 5/1993 | Buonpastore .............................. 55/502 |
| 5,207,812 | 5/1993 | Tronto et al. .............................. 55/498 |
| 5,211,846 | 5/1993 | Kott et al. .................................. 55/502 |
| 5,222,488 | 6/1993 | Forsgren .................................... 55/521 |
| 5,290,446 | 3/1994 | Degen et al. .............................. 55/486 |
| 5,336,405 | 8/1994 | Tang et al. ................................. 55/502 |
| 5,632,791 | 5/1997 | Oussoren et al. .......................... 55/486 |
| 5,885,314 | 3/1999 | Oussoren et al. .......................... 55/486 |

Primary Examiner—David A. Simmons
Assistant Examiner—Minh-Chau T. Pham
Attorney, Agent, or Firm—Shook, Hardy & Bacon

[57] ABSTRACT

A filter cartridge according to the present invention is provided having a unitary structure with a pleat pack formed securely about an interior screen. Opposite ends of the pleat pack and interior screen are integrally formed within a bottom end cap and an upper sleeve. The bottom end cap is constructed to follow the contour of the pleat pack to minimize the collection of dust about the bottom perimeter thereof. The upper sleeve is formed of a flexible material which may be manually deformed to pass through an opening in a tube sheet which retains the filter cartridge. The upper sleeve includes a lower lip extending along the interior of the inner screen to securely engage the inner screen. The lower lip is formed integrally with a radially extending ledge which is formed with an upwardly projecting funnel shaped side wall. The side wall includes an inner grove at its upper end which extends about a perimeter of the top sleeve. A supporting ledge is formed upon the upper end of the side wall and projects radially outward about a perimeter of the filter cartridge. The supporting ledge need not be continuous, so long as it is capable of supporting the filter cartridge.

8 Claims, 1 Drawing Sheet

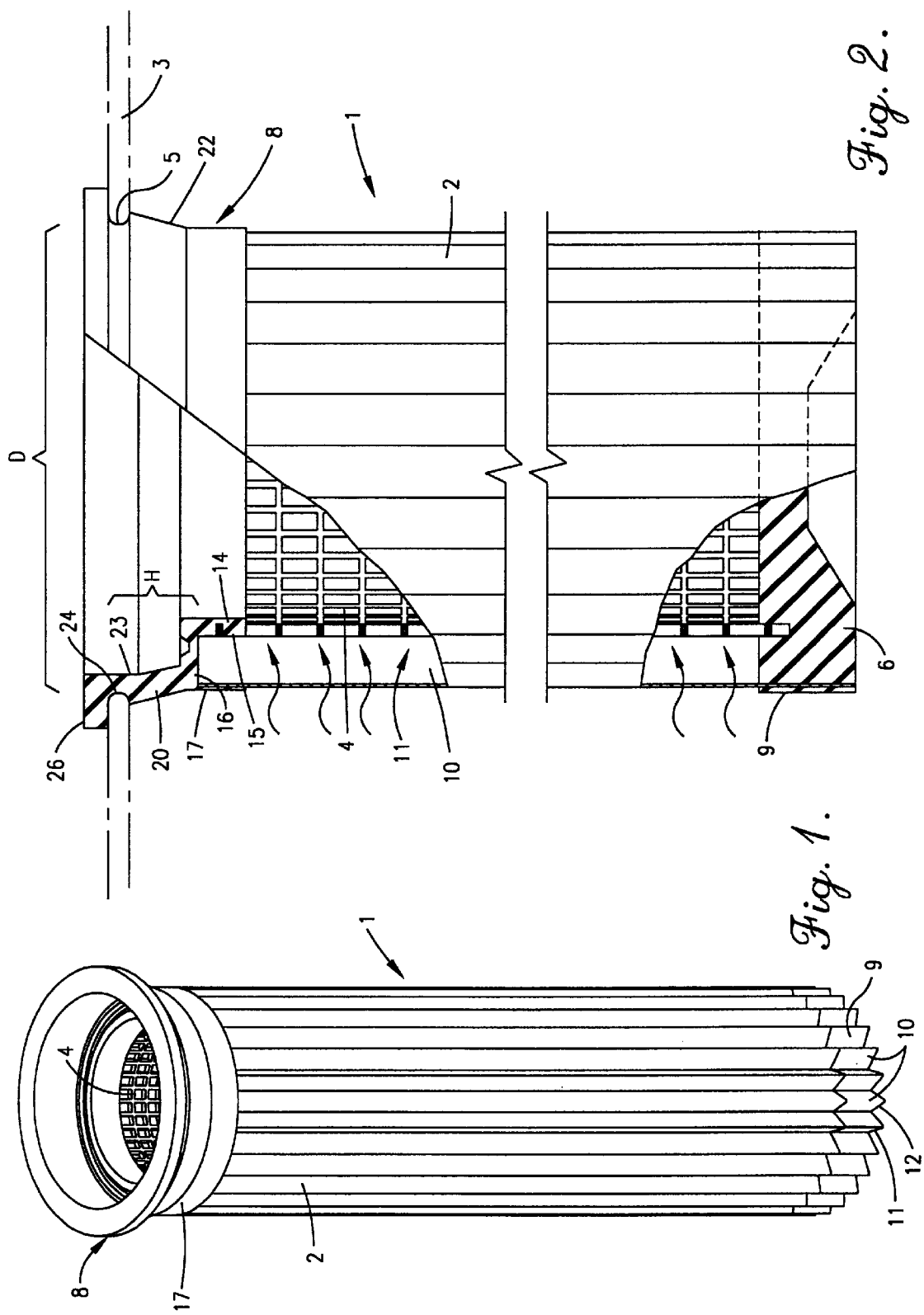

UNITARY FILTER CARTRIDGE

This application is a continuation application of our application Ser. No. 08/862,552, filed May 23, 1997, now U.S. Pat. No. 5,885,314, issued Mar. 23, 1999, which is a continuation application of our application Ser. No. 08/350,885, filed Dec. 6, 1994, now U.S. Pat. No. 5,632,791, issued May 27, 1997, which is a continuation-in-part application of our design paten application Ser. No. 29/022,499, filed May 6, 1994, now abandoned.

FIELD OF THE INVENTION

The present invention generally relates to industrial baghouses and more particularly to an air filter cartridge for removing particles or dust from a stream of air moving through the baghouse.

BACKGROUND OF THE INVENTION

This invention relates to industrial baghouses and more particularly, to a tensioning device for connecting cylindrical bag filters to an overhead support.

Continuous emphasis an environmental quality has resulted in increasingly strenuous regulatory controls an industrial emissions. One technique which has proven highly effective in controlling air pollution has been separation of undesirable particulate matter from a gas stream by fabric filtration. Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within openings in the tube sheet are fabric filters (also referred to as air filter cartridges). A particulate laden gas stream induced by the action of a fan, blows into one chamber (dirty air plenum) wherein dust accumulates on the fabric filter as the gas passes through the fabric into the other plenum (clean air plenum) and out an exhaust. Although all baghouses are designed in accordance with the foregoing general principles, there are numerous operation and structural distinctions including numerous differences in the structure of the air filter cartridge. The present invention relates to a baghouse wherein a plurality of cylindrical air filter cartridges having closed lower ends are vertically suspended in the dirty air plenum from the tube sheet. The upper ends of the air filter are fixed to openings in the tube sheet. Filtration of the process gas occurs from outside to inside of the filters (i.e., the dust collects on the outside surface of each air filter cartridge).

During continuous operation of the baghouse, the bags must he periodically cleaned and removed. This may be done by interrupting the flow or the process gas carrying particulate matter and then causing reverse cleaning air to flow from the clean air plenum to the dirty air plenum. The reverse flow of cleaning air causes the dust cake to be dislodged and fall from the exterior of the filter cartridge to the dirty air plenum for removal by an auger or similar means. In some baghouse installations, reverse air cleaning may also be supplemented with mechanical shaking of the filters.

Even when a filter bag is properly installed, it is reasonable to expect the fabric to stretch and deteriorate with age and with repeated cyclings between the filtering and cleaning modes of operation. Thus, the filters must be periodically checked and replaced.

The installation and maintenance of filter cartridges of this type has traditionally been a time consuming and costly operation. Accordingly, there has been a long felt need in this industry for improvements in filter cartridge assemblies and mounting techniques to alleviate the many installation and maintenance difficulties which have been encountered.

In the past, a filter cartridge has been proposed (such as in European patent publication number 0 160 168 A2) which comprises a pleated filter medium disposed between an open end cap and a closed end cap. The filter medium is woven through off-set inner and outer support wires which defined the pleated arrangement. The support wires are attached at each end to a frame within the end caps and are formed to exert pressure an the filter medium to support it against inner pressure from a pulsed jet cleaning device.

Additionally, the filter cartridge of the '168 publication utilizes a separate securing bolt inserted upward through the center of the lower end can and secured to a threaded recess proximate the upper end cap in order to seal the cartridge to the support frame. Hence, this filter cartridge is quite difficult to install and remove.

An alternative filter cartridge has been proposed, such as in World Patent 90/11116, which attempts to minimize the amount of filtered material which passes through the filter when the pleated filter material is torn. The filter of the '116 patent discloses a pleated filter, each fold of which defines a longitudinally extending triangular pocket. A filter pipe is inserted along the interior of the pleats and constructed with continuous longitudinal ridges along a length thereof. The ridges form rib shaped elements extending along the longitudinal axis of the filter and having a triangular cross section substantially corresponding to that of the packets formed about the interior contour of the pleats. The ridges may consist of a foam material applied to the filter pipe.

The filter cartridge of the '116 patent may be attached to a metal retaining plate through a retaining lip formed at the filter's upper end. The retaining lip includes an external annular grove about its perimeter which receives the retaining plate in order to hold the cartridge in position. The pleat pack is suspended from the retaining lip. An interior annular groove is provided proximate tile external annular groove. The interior groove receives an expanding part having an expanding ridge about its perimeter. The expanding part is securely mounted to the filter pipe which is suspended therefrom. The expanding part and the retaining lip are formed as separate components. To install the filter cartridge into the support frame, the expanding part and filter pipe are removed from the retaining lip to allow the retaining lip to compress inward and pass through an opening in the lower end of the retaining plate. Once the retaining plate is received within the outer notch of the retaining lip, the expanding part is inserted upward through the pleat pack with the filter pipe oriented such that the pipe folds aligning wish the ridges about the pleat.

An alternative filter cartridge has been proposed, in European patent (EP 0 498 757 A1), which is intended to prevent build up of dirt particles about the bottom end of the filter cartridge. To achieve this objective, the cartridge of the '757 patent forms a lower end cap which substantially follows the star shaped pattern of the pleats. The filter cartridge of the '757 patent is manufactured by placing the filter star tightly upon a base plate. A liquid compound, which when hardened will form the bottom end cap, is applied to the sealed base plate, within the filter star. The liquid material flows into the inner recesses in the filter star to fill the inner radial folds of the star-shaped pleats.

However, the systems proposed heretofore have experienced disadvantages. In particular, the filter cartridges of the '116 patent and '168 publication require unduly complex structures having multiple parts which must be assembled before the cartridges are inserted. Such assembly is extremely difficult. Further, the filter cartridge of the '168 publication utilizes a bottom end cap which bridged the spaces between adjoining pleats within the filter medium, thereby forming a ledge about the bottom of the filter cartridge. This ledge collects dust and filtered material which clogs the lower end of the filter cartridge.

The cartridge of the '116 patent utilizes an inner cage having triangular shared ridges extending longitudinally there along about its perimeter. To insert this cage, and the expanding part on the top end thereof, each of the triangular ridges must be aligned with a corresponding triangular recess in the perimeter of the pleats. This alignment is extremely difficult. Moreover, to remove the filter cartridge of the '116 patent, the retaining part and the cage must first be removed before the pleats can be removed. This operation undesirably complicates the filter changing process.

The cartridge of the '757 patent requires an overly complex manufacturing process. Additionally, the filter of the '757 patent utilizes an inner cage within the filter element which is permanently secured to rigid top and bottom end caps. Hence, the filter of the '757 patent exhibits an extremely rigid structure encompassing both end caps, thereby requiring separate securing means to attach the filter to the system. The separate securing means increase the number of parts and necessitate unduly complex installation and removal processes.

It is an object of the present invention to overcome the problems experienced by the foregoing systems.

SUMMARY OF THE INVENTION

A filter cartridge according to the present invention is provided having a unitary structure with a pleat pack formed securely about a tubular interior screen. Opposite ends of the pleat pack and interior screen are integrally formed within a bottom end cap and an upper or top sleeve. The bottom end cap is constructed to follow the contour of the pleat pack to minimize the collection of dust about the bottom perimeter thereof. The upper sleeve is formed of a flexible material which may be manually deformed to pass through an opening in a tube sheet which retains the filter cartridge. The interior screen ends below the upper end of the sleeve to maintain the flexibility of the upper sleeve. The top sleeve comprises a lower lip extending along the interior of the inner screen to securely engage the inner screen. The lower lip is formed integrally with a radially extending ledge which is formed with an upwardly projecting funnel shaped side wall. The side wall includes an inner grove at its upper end which extends about a perimeter of the top sleeve. A supporting ledge is formed upon the upper end of the side wall and projects radially outward about a perimeter of the filter cartridge The supporting ledge need not be continuous, so long as it is capable of supporting the filter cartridge.

DETAILED DESCRIPTION OF THE DRAWINGS

The objects and features of the invention noted above are explained in more detail with reference to the drawings, in which like reference numerals denote like elements, and in which:

FIG. 1 illustrates a perspective view of a filter cartridge according to the present invention; and FIG. 2 illustrates a side elevational view of a filter cartridge with portions thereof broken out in cross section.

DETAILED DESCRIPTION OF THE INVENTION

FIG. 1 generally illustrates a filtered cartridge according to the present invention as designated by the reference numeral 1. The filter cartridge 1 is received within a tube sheet 3 having an opening 5 therethrough with a diameter D. The cartridge 1 filters particulate material from air or liquid as the air or liquid passes radially inward through the cartridge 1 and upward though the opening 5. The filter cartridge 1 includes a pleat pack 2 (also referred to as a filter sheet or filter medium) formed in a substantially tubular shape about a filtered chamber with accordion folds about a perimeter thereof. The pleat pack 2 may be constructed of any conventionally known filtering medium. Each fold is constructed with outer filter walls 10 extending along the length of the cartridge 1. Adjoining filter walls 10 form internal and external V-shaped voids 11 and 12.

The pleat pack is formed about, and abuts firmly against, a tubular inner screen 4 having a rectangular mesh pattern therethrough. The inner screen 4 may be constructed of any conventionally used screening medium, such as plastic, metal and the like. The inner screen 4 is constructed in a tubular shape and extends along a substantial majority of the length of the pleat pack 2. Upper and lower ends or rims of the pleat pack 2 and inner screen 4 are securely received within a top support sleeve 8 (FIG. 2) and a bottom end cap 6. The bottom end cap 6 and the ton sleeve 8 are moldably and integrally formed with the pleat pack 2 and screen 4 as will be explained in more detail below. The top sleeve 8 represents an encasement which defines a discharge port from the filtered chamber through the opening 5.

The bottom end cap 6 includes an outer rim 9 formed to the exterior of the pleat pack 2 and following the contour of the filter walls 10. The outer rim 9 is formed when the potting material forming the end cap 6 passes through the lower end of the screen 4 and through the pleat pack 2. The outer rim 9 is joined integrally with the end cap 6 through the pleat pack 2. The bottom end cap 6 may be formed of a conventionally known resilient material, so long as it affords sufficient rigidity to support the pleat pack 2 and inner screen 4. For instance, the bottom end cap 6 may be formed of urethane, polyurethane, fluorocarbons, silicon compounds and the like. By way of example, the bottom end cap 6 may be formed of urethane material having a resiliency with a durometer rearing broadly within a shore A range of 30–70 and preferably between 50–65.

The top sleeve 8 may be constructed of urethane, polyurethane, fluorocarbons, silicon compounds and the like, so long as the material forming the top sleeve 8 affords sufficient softness to be manually deformed and inserted through the opening 5 in the tube sheet 3. More specifically, the top sleeve 8 should be constructed of flexible material having a durometer reading of no greater than 70 shore A. By way of example, the top sleeve 8 should be formed of urethane having a durometer reading within share A 30–70 and preferably 50–65, and optimally of approximately 50 shore A. If the durometer measurement of the material exceeds its upper limit, the top sleeve becomes too rigid and unduly difficult to manually deform in a collapsed position at which it is removed from the opening 5 in the tube sheet 3. The flexibility of the top sleeve 8 may vary depending upon the dimensions thereof (as explained below).

FIG. 2 illustrates the cross-section of the top sleeve 8 in more detail. Beginning at its bottom, the top sleeve 8 includes inner and outer lower rims 14 and 17 extending downward about the interior and exterior surfaces of the upper end of the inner screen 4 and pleat pack 2. The inner rim 14 includes knobs 15 projecting outward therefrom and securely engaging the openings within the mesh pattern of the upper portion of the screen 4. In this manner, the top sleeve 8 is securely retained to the inner screen 4. The outer rim 17 penetrates and securely engages the pleat pack 2. The inner and outer rims 14 and 17 of the top sleeve 8 are integrally formed with one another and with a lateral ledge 16 extending radially outward over the top of the screen 4 and over the upper end of the filter walls 10. The outer rim 17, lateral ledge 16 and inner ram 14 enclose and are securely molded to the upper end of the pleat pack 2 and screen 4.

A funnel shaped side wall 20 is formed integrally with the lateral ledge 16 and projects vertically upward and radially outward therefrom. The funnel shaped side wall 20 extends beyond the upper ends of the pleat pack 2 and the inner screen 4. Means is provided about the exterior surface 22 of the side wall 20 to secure the cartridge 1 to the tube sheet 3, such as a receiving groove 24. The center of the groove 24 is located at a predefined height H above the top of the filter wall 10 of the pleat pack 2. The uppermost end of the side wall 20 is flared radially outward to form a supporting ledge 26 immediately above and adjacent the groove 24. The groove 24 extends about the perimeter of the side wall 20 and is formed to receive the edge of the opening 5 within the tube sheet 3. The supporting ledge 26 extends radially outward beyond the side wall 20 to securely engage the upper surface of the tube sheet 3.

The top sleeve 8 is configured to ensure easy removal of the cartridge 1 from the tube sheet 3. This removal is achieved by constructing the top sleeve 8 from a material having a maximum amount of resiliency and by ensuring that the height H remains within a predefined relation (H/D) to the diameter D of the opening 5 in the tube sheet 3. Specifically, the relation $0.3<H/D<0.85$ should be maintained, while the relation $0.3<H/D<0.75$ is preferable and $H/D\sim0.7$ is optimal, where H corresponds to the vertical distance between the top edge of the filter wall 10 of the pleat pack 2 and the center of the groove 24 and the diameter D corresponds to that of the opening 5 in the tube sheet 3.

The groove 24 is constructed with a depth having an inner diameter slightly greater than the diameter of the opening 5 in the tube sheet, such that the top sleeve 8 must remain slightly compressed when the sleeve 8 is snugly fit into the opening 5. This diameter variation maintains a sealed relation between the filter cartridge 1 and tube sheet 3.

Optionally, a separate resilient band which is spring tempered such as a stainless steel band and the like, may be constructed with an outer diameter substantially equal to or slightly greater than the inner diameter of the top sleeve 8 proximate the grooves 24 (i.e., at point 23). This band may be easily deformed (i.e., by twisting it to construct a figure eight shape) and inserted into the interior of the top sleeve 8. The band is allowed to expand to its circular form, at which it snugly engages the interior wall 23 of the top sleeve 8. This band increases the sealing pressure against the side wall 20 to ensure that the grooves 24 properly seat against the opening 5. This design insures that the cartridge 1 is capable of use with openings 5 which have not been precisely cut to correspond to the diameter of the groove 24.

To effect installation and removal of the cartridge 1, a maintenance person grasps the cartridge 1 and applies radial pressure inward against the side wall 20 immediately adjacent the tube sheet 3. As the side wall 20 collapses radially inward, the groove 24 and ledge 26 similarly collapse inward away from the edge of the opening 5 in the tube sheet 3. The side wall 20 is collapsed inward until a sufficiently large section of the ledge 26 and groove 24 clear the tube sheet 3 to allow removal of the cartridge 1. Next, the maintenance person merely pries the cartridge 1 to one side, in order to disengage the remaining portion of the groove 24 and ledge 26 away from the tube sheet 3.

Hereafter, a method of manufacturing the foregoing cartridge will be explained.

Initially, the lower end of the pleat pack 2 and screen 4 are dipped in liquid urethane, and the like which acts as a bonding agent to bond the material forming the bottom end cap and the pleat pack. Thereafter, the pleat pack 2 and screen 4 are positioned within a mold having an exterior contour substantially conforming to the desired shape of the pleat pack 2 (i.e., a star or accordion shape). Next, a potting urethane, polyurethane, fluorocarbon, or silicon compound and the like is injected into the mold within the screen 4 and directed radially outward therethrough and outward through the pleat pack 2. As the potting compound flows outward through the screen 4 and pleat pack 2, it contacts the bonding agent and seats therewith. The potting compound adheres to the screen 4 and pleat pack 2 and hardens to form the bottom end cap. In this manner, the potting compound completely encloses and surrounds the inner and outer surfaces. The mold, which follows the outer contour of the filter walls 10, maintains the potting compound in an accordion or star shape once it flows through the filter wall 10. This pattern prevents the formation of a bottom end cap which bridges the pleats thereby avoiding the collection of dirt about the bottom of the filter while maintaining a secure connection between the pleat pack 2, inner screen 4, and bottom end cap 6. Optionally, the dipping step may be omitted if a sufficient bond is obtained with the pleat pack and screen.

The foregoing process is repeated to produce the top sleeve, except that the upper end of the pleat pack 2 and inner screen 4 are inserted into a mold conforming to the desired inner and outer contours of the top sleeve 8 as described above in connection with FIG. 2. The top ends of the pleat pack 2 and screen 4 are not necessarily dipped in liquid urethane before being placed in the mold. Thereafter, the potting compound is injected into the interior of the screen and flows outward through the screen and pleat pack to form the inner and outer rims 14 and 17, and the lateral ledge 16.

It is to be understood that the present invention is not limited to the particular embodiment illustrated in FIGS. 1 and 2. For instance, the present filter may be constructed from a variety of shaves, sizes and configurations. For instance, the instant filter and top sleeve may be formed in an oval shape, a rectangular shape, a multi-sided shape and the like, so long as the upper sleeve 8 is formed of sufficiently flexible material and configuration to be manually removed from the tube sheet 3. Moreover, the filter cartridge need not necessarily include a solid bottom end cap. Instead, the filter cartridge may be constructed with a bottom portion formed of filtering medium, such as if the filter were formed in a spherical shape, egg shape and the like so long as the filtering medium provided at least one discharge port proximate the sleeve 8. Further, both ends of the filter cartridge may be provided with discharge ports enclosed within top and bottom sleeves, both of which resemble sleeve 8.

Moreover, the top sleeve 8 need not include a funnel shaped side wall 20, but instead may include a side wall having any desirable shape so long as the side wall engages the tube sheet 3 at a height H above the top of the inner screen 4. As explained above, the height H between the top of the inner screen 4 and the center of the groove 24 which intersects the tube sheet 3 must maintain a desired relation to the diameter D of the opening 5 in the tube sheet 3 which facilitates manual deflection of the top sleeve 8.

Further, the top sleeve 8 need not necessarily include a single groove 24 as means for adjoining the opening 5. Instead, the tube sheet 3 and the side wall 20 may include correspondingly contoured surfaces so long as a seal is maintained. For instance, the opening 5 and side wall 20 may include multiple ribs and multiple grooves aligned with one another. Further, the grooves 24 may be formed with any desired cross-section, such as rectangular notches and the like. The intersecting surfaces between the top sleeve 8 and tube sheet 3 may alternatively be provided with a screw type groove arrangement which allows the filter cartridge to be screwed into the tube sheet 3. As the surface area of the contacting surfaces between the top sleeve 8 and tube sheet 3 increases (i.e. such as by the inclusion of multiple grooves and recesses upon each component), the top sleeve a may be formed of a material having more flexibility. This decreases the need for resiliency due to the increased surface area contact between the filter cartridge and the tube sheet. Hence a more easily deformed cartridge may be provided, while maintaining a sufficient seal with the tube sheet 3.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, we claim:

1. A unitary filter cartridge to be removably and sealingly received within a circular opening through a tube sheet separating the clean and dirty plenums of filtration apparatus, said tube sheet having an upper surface, a cylindrical mouth surface and a lower surface, said filter cartridge comprising:

a filter sleeve formed as a tubular member having an open upper end oriented toward said tube sheet and an open lower end oriented away from said tube sheet;

a tubular screen positioned interiorly of said filter sleeve for structural support thereof, said tubular screen having an open upper end oriented toward said tube sheet and an open lower end oriented away from said tube sheet;

a bottom end cap permanently and sealingly secured to the lower end of said filter sleeve and to the lower end of said tubular screen to close said lower ends of said filter sleeve and tubular screen; and a unitary tubular, upper sleeve fitting including a lower portion extending beneath said tube sheet and an upper flange portion extending above said tube sheet all integrally formed of flexible, resiliently deformable material, said lower portion of said sleeve fitting permanently securing said upper ends of said filter sleeve and said tubular screen, said upper flange portion of said sleeve fitting overlying said tube sheet adjacent said circular opening to suspendingly support the filter cartridge from said tube sheet, and said sleeve fitting deformably contacting with at least a portion of said upper surface of said tube sheet adjacent said circular opening, with said cylindrical mouth surface of said tube sheet and with at least a portion of said lower surface of said tube sheet adjacent said circular opening to affect sealing engagement therewith.

2. The unitary filter cartridge as in claim 1, wherein said sleeve fitting being resiliently deformed when positioned in sealing engagement with the lower surface of said tube sheet from a diameter slightly greater than the diameter of said circular opening to taper downwardly therefrom to a diameter less than or equal to the diameter of said circular opening.

3. The unitary filter cartridge as in claim 1, wherein said bottom end cap having an outer contour following and conforming to an outer contour of said filter sleeve proximate said bottom end thereof.

4. The unitary filter cartridge as in claim 1, wherein said tubular filter sleeve having a pleated cross-section.

5. The unitary filter cartridge as in claim 1, wherein said sleeve fitting being resiliently deformed exteriorly to a funnel-shaped side wall having a circular horizontal cross-section and a frusto-conical vertical cross-section.

6. The unitary filter cartridge as in claim 1, wherein said unitary sleeve fitting is formed of a material having a durometer reading between 30 shore A and 70 shore A.

7. The unitary filter cartridge as in claim 1, wherein said sleeve is configured to satisfy a relation $0.3<H/D<0.85$; wherein D represents the diameter of said circular opening through said tube sheet and H represents a distance between the upper end of said filter sleeve and said circular opening through said tube sheet.

8. The unitary filter cartridge as in claim 1, further comprising:

a separate band having an outer diameter substantially equal to the inner diameter of said upper flange portion of said unitary tubular, upper sleeve fitting, said band engaging the inner surface of said sleeve fitting proximate said circular opening through said tube sheet to affect sealing engagement with said cylindrical mouth surface of said tube sheet and with at least a portion of said lower surface of said tube sheet adjacent said circular opening.

* * * * *